United States Patent
Wilson

(10) Patent No.: US 10,731,345 B1
(45) Date of Patent: Aug. 4, 2020

(54) COUPLING ENCAPSULATOR FOR REPAIRING POST-TENSIONED CONCRETE

(71) Applicant: James Andrew Wilson, Tequesta, FL (US)

(72) Inventor: James Andrew Wilson, Tequesta, FL (US)

(*) Notice: Subject to any disclaimer, the term of this patent is extended or adjusted under 35 U.S.C. 154(b) by 0 days.

(21) Appl. No.: 16/520,438

(22) Filed: Jul. 24, 2019

Related U.S. Application Data

(60) Provisional application No. 62/820,343, filed on Mar. 19, 2019.

(51) Int. Cl.
*E04C 5/16* (2006.01)
*E04C 5/12* (2006.01)
*F16G 11/04* (2006.01)

(52) U.S. Cl.
CPC .............. *E04C 5/165* (2013.01); *E04C 5/122* (2013.01); *F16G 11/04* (2013.01)

(58) Field of Classification Search
CPC . E04C 5/12; E04C 5/165; E04C 5/122; E04C 5/08
USPC ...................................................... 52/223.13
See application file for complete search history.

(56) References Cited

U.S. PATENT DOCUMENTS

| | | | |
|---|---|---|---|
| 3,936,256 A | 2/1976 | Howlett et al. | |
| 4,707,890 A * | 11/1987 | Savall | F16G 11/048 24/122.6 |
| 5,072,558 A * | 12/1991 | Sorkin | B29C 45/14 52/223.13 |
| 5,259,703 A * | 11/1993 | Gillespie | E21D 21/006 405/259.1 |
| 5,770,286 A * | 6/1998 | Sorkin | E04C 5/08 138/96 R |
| 5,788,398 A * | 8/1998 | Sorkin | E04C 5/12 285/138.1 |
| 5,839,235 A * | 11/1998 | Sorkin | E04C 5/10 52/223.13 |
| 6,151,850 A | 11/2000 | Sorkin | |
| 6,176,051 B1 | 1/2001 | Sorkin | |
| 6,381,912 B1 | 5/2002 | Sorkin | |
| 10,221,570 B2 * | 3/2019 | Schmidt | E04C 5/122 |
| 2005/0097843 A1* | 5/2005 | Giesel | E04C 5/08 52/223.1 |
| 2016/0208490 A1 | 7/2016 | Wilson | |
| 2016/0305140 A1 | 10/2016 | Wilson | |
| 2018/0016789 A1* | 1/2018 | Sorkin | E04C 5/08 |
| 2018/0179756 A1* | 6/2018 | Schmidt | E04C 5/122 |
| 2019/0323238 A1* | 10/2019 | Mikulsky | E04G 21/12 |

* cited by examiner

*Primary Examiner* — Rodney Mintz
(74) *Attorney, Agent, or Firm* — Simpson & Simpson, PLLC

(57) ABSTRACT

A coupling encapsulator for a post-tension cable splice coupler, including a tubular member including a first end and a second end, a first end cap, including a first segment operatively arranged to engage the first end, a second segment connected to the first portion, wherein the first segment extends from the second segment in a first axial direction, and a first flange connected to the second segment and extending radially inward in the first axial direction, and a second end cap, including a third segment operatively arranged to engage the second end, a fourth segment connected to the third segment and extending in a second axial direction, opposite the first axial direction, and a second flange connected to the fourth segment and extending radially inward in the second axial direction.

20 Claims, 5 Drawing Sheets

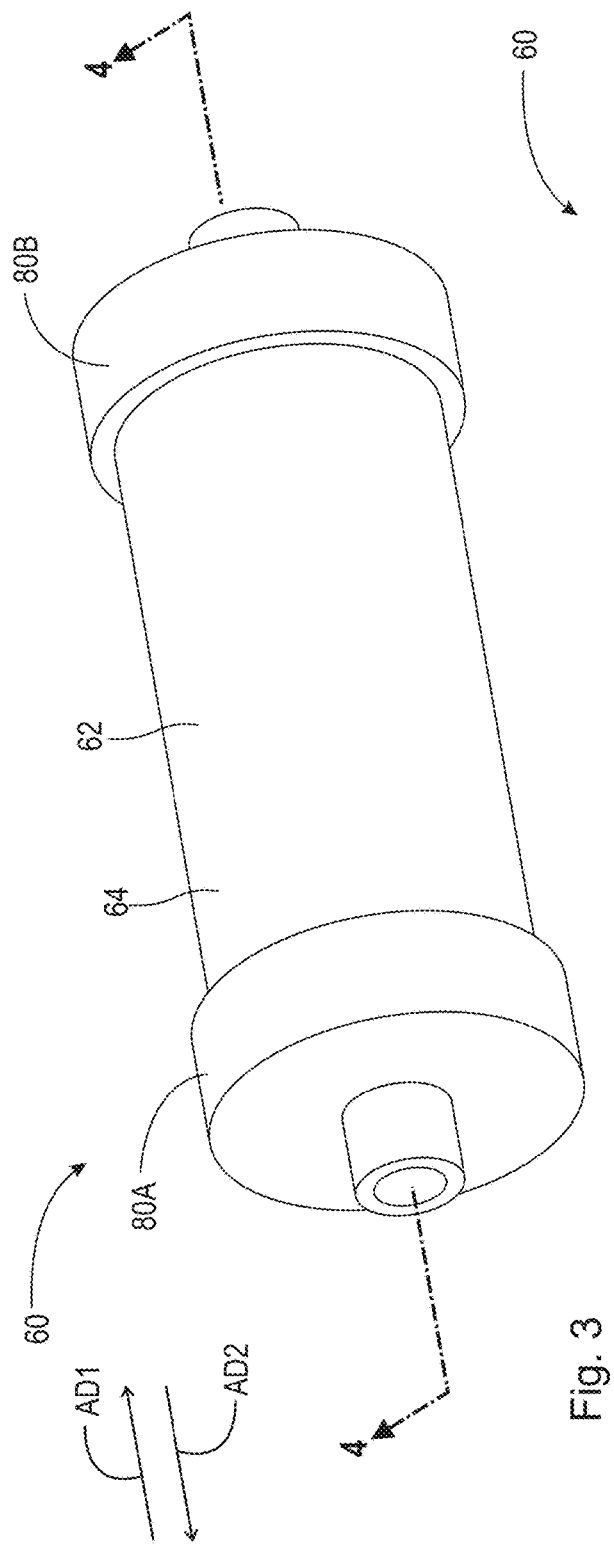
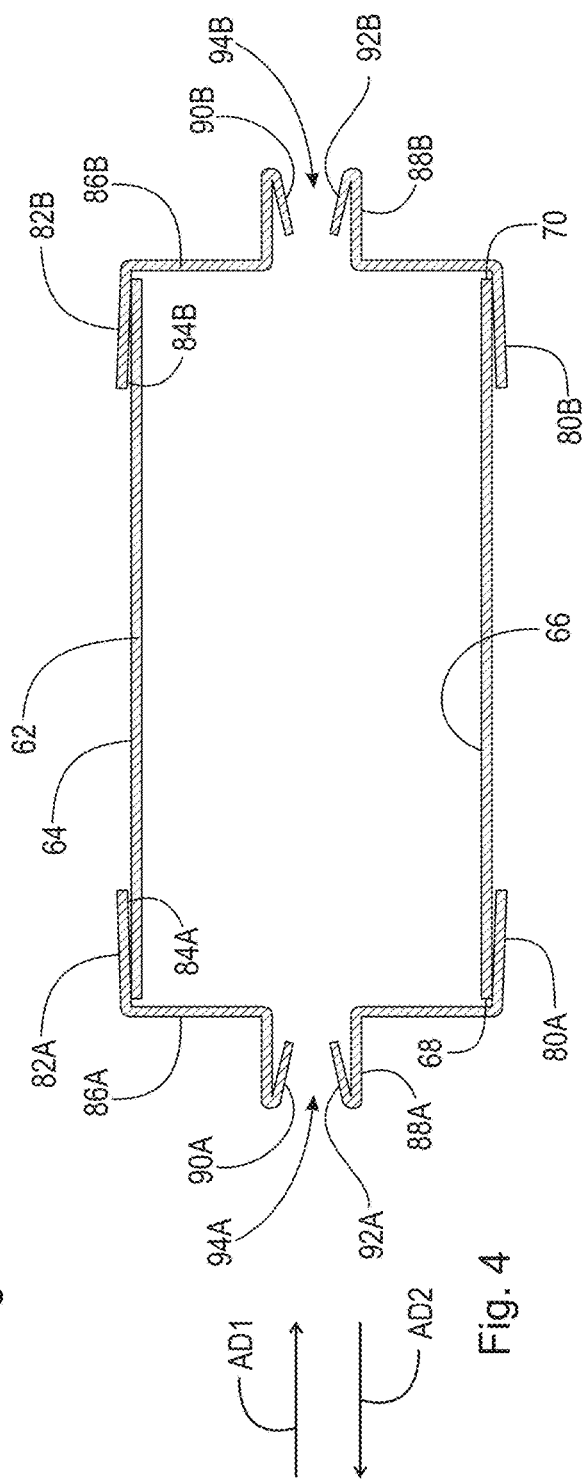
Fig. 3
Fig. 4

COUPLING ENCAPSULATOR FOR REPAIRING POST-TENSIONED CONCRETE

CROSS-REFERENCE TO RELATED APPLICATIONS

This Application claims the benefit under 35 U.S.C. § 119(e) of U.S. Provisional Patent Application No. 62/820,343 filed Mar. 19, 2019, which application is incorporated herein by reference in its entirety.

FIELD

The present disclosure relates to repairing post-tensioned concrete, and more particularly, to a coupling encapsulator for a post-tensioned cable splice coupler.

BACKGROUND

Post-tensioned concrete is widely used in building structures as it provides a light, structurally efficient, durable solution for the construction of commercial office buildings, residential apartments, high-rise condominiums, and mixed-use facilities such as hotels and casinos. Post-tensioned concrete is also utilized frequently in the elevated concrete decks and sometimes in the ground floor slabs of condominium structures, including the associated parking garages. Longer, thinner slabs result in greater design flexibility and require less reinforcing steel to achieve the same strength as other methods of construction. Additionally, post-tensioned concrete greatly reduces the floor-to-floor height when compared to structural steel options, which results in significant savings in the façade, HVAC, electrical, plumbing, and vertical transportation systems. As such, post-tension concrete was introduced into residential high-rise construction as a means to reduce the thickness of the elevated concrete decks, to widen spans between column supports, and to speed up the construction process.

Generally, post-tension reinforcement includes stranded cables, also referred to as "tendons" or a "strand," that are contained typically in a plastic sheath and are positioned in the forms before the concrete is poured. Afterwards, once the concrete has gained strength but before the service loads are applied, the cables are pulled tight, or "tensioned," and anchored against the outer edges of the concrete. Concrete has a very high compressive strength, typically 3,000 to over 10,000 psi, but very low tensile strength, typically 300 to 400 psi. Post-tension cables provide tensile strength to the concrete. This increase in tensile strength is achieved when the cables are stressed under significant tension loads following the pouring of the concrete.

In the past, a post-tension slab was typically constructed with cables laid out in two directions, typically at 90 degrees to one another. The cables are enclosed in a plastic sheathing to separate them from, and allow for movement within, the surrounding concrete. Each cable is anchored at one end of the slab and then placed loosely across the slab to another steel anchor located at the opposite end of the slab. Two steel reinforcing bars are placed behind the anchors to help distribute the high tensions forces from the anchors. Once the steel, cables, and anchors are installed, the concrete is poured. After the concrete has reached an acceptable strength, the cable is tensioned within the concrete slab, which is achieved by pulling the cable to a force of approximately 33,000 pounds. Two steel wedges are placed around the cable and within the anchor to lock the cable at the applied tension load.

Many early post-tension installations did not include corrosion protection of the steel anchorage and cable ends. As a result, penetration of moisture through the concrete often results in the corrosion of the post-tension cable, anchor, and wedges. The presence of corrosion can have a substantial impact on the structural integrity of the post-tension system. Additionally, a post-tension cable can be compromised when types of restoration, renovation, or remedial work are being performed on a post-tensioned reinforced structure. Moreover, post-tension cables can also be compromised when the original construction was performed poorly or maintenance of the exterior of a building is not performed on a regular basis. In any of these situations, the ends of the cables at the edges of concrete are allowed to corrode, and without proper maintenance, the corrosion can advance to the point where cables or end anchors fail.

Repair of a damaged post-tension cable is performed by typically exposing one or both ends of the damaged cable at the edges and at one or multiple locations where the cable breeched the concrete. A new cable or portion of a cable is used to replace the damaged cable. If the entire cable is replaced, the old cable is removed from the plastic sheathing within the concrete and a new cable is installed through the sheathing. The affected sheathing and the concrete are then repaired, and allowed to cure. The cable is then tensioned and the ends patched. If only a portion of a cable is replaced, the connection of the new cable to the older cable is accomplished with a post-tension cable splice and/or coupler and then repaired in the same fashion as replacing the entire cable mentioned above.

Due to the extremely high force in the cables, removal of the concrete behind the anchor and bars can cause a significant failure of the slab. As a result, replacement of deteriorated anchors requires de-tensioning of the affected cable. It should be noted that only the damaged portion of the cable is de-tensioned during repairs, as the remaining cable must retain post-tension force in order to maintain the structural integrity of the slab. The de-tensioning of the cable is accomplished by opening a small area of the concrete slab inward from the area to be repaired. Within this opening, a temporary cable "lock-off" device is installed. The lock-off location is generally two to three feet from the edge so that the cable forces can flow or be redirected around the opening with a risk of a concrete failure. The outer portion of the cable is then released, and repairs can begin.

During concrete repairs, replacement anchors and cables are installed. To provide protection against corrosion, plastic sheathed anchorage systems that protect all the parts of the anchors and cables are used. The cables are usually encased in a flexible plastic protective hose, typically called a sheath or duct, to prevent the cable from bonding to the concrete during placement and curing of the concrete. The protective sheathing remains in the structure. In some cases, the void between the cable and the sheath is filled with grout. In this manner, the cable becomes bonded to the concrete section and corrosion of the steel cable is prevented. In other cases, the cable is coated with grease prior to placement into a protective sheathing. Cables of this type are not pressure grouted after stressing. This type of post-tensioning is usually referred to as an un-bonded post-tensioning system. Once installed, and the new cable is spliced to the lock-off cable, concrete is poured and allowed to cure.

A tendon anchorage and mounting means is disclosed in U.S. Pat. No. 3,936,256 (Howlett et al.). Howlett discloses an anchor for a concrete pre-stressing tendon that is arranged at the edge of a concrete slab. Howlett further discloses a member that blocks the entry of concrete into the end of the mounting means of the anchor. However, Howlett does not disclose a member that shields a post-tension cable splice coupler from corrosion and blocks entry of concrete therein. Instead, Howlett discloses a member that shields an anchor that is fixed (i.e., does not move) within or about a concrete slab.

An apparatus and method for sealing an intermediate anchor of a post-tension anchor system is disclosed in U.S. Pat. No. 6,381,912 (Sorkin). Sorkin discloses an apparatus specifically for post-tensioning systems having intermediate anchorages. In many post-tension systems, the length of the concrete slab is too long to tension with a single anchor. In these systems, an intermediate anchor is interposed between a live end and a dead end anchor. Sorkin further discloses a sheathing system for the intermediate anchor that prevents the intrusion of liquid therein. However, Sorkin does not disclose a member that shields a post-tension cable splice coupler from corrosion and blocks entry of concrete therein. Instead, Sorkin discloses a member that shields an anchor that is fixed (i.e., does not move) within or about a concrete slab.

Thus, there is a long felt need for an apparatus that shields a post-tension cable splice coupler from the intrusion of moisture and concrete therein, thereby preventing corrosion and also allowing the splice coupler to displace relative to the concrete once the concrete has set.

SUMMARY

According to aspects illustrated herein, there is provided a coupling encapsulator for a post-tension cable splice coupler, comprising a tubular member including a first end and a second end, a first end cap, including a first segment operatively arranged to engage the first end, a second segment connected to the first portion, wherein the first segment extends from the second segment in a first axial direction, and a first flange connected to the second segment and extending radially inward in the first axial direction, and a second end cap, including a third segment operatively arranged to engage the second end, a fourth segment connected to the third segment and extending in a second axial direction, opposite the first axial direction, and a second flange connected to the fourth segment and extending radially inward in the second axial direction.

According to aspects illustrated herein, there is provided a post-tensioned concrete assembly, comprising a first cable, a second cable, a post-tension cable splice coupler connecting the first cable and the second cable, and a coupling encapsulator, including a tubular member including a first end and a second end, the post tension cable splice coupler arranged within the tubular member, a first end cap, including a first segment operatively arranged to engage the first end, a second segment connected to the first portion, wherein the first segment extends from the second segment in a first axial direction, and a first flange connected to the second segment and extending radially inward in the first axial direction, wherein the first cable is operatively arranged to extend through the first flange, and a second end cap, including a third segment operatively arranged to engage the second end, a fourth segment connected to the third segment and extending in a second axial direction, opposite the first axial direction, and a second flange connected to the fourth segment and extending radially inward in the second axial direction, wherein the second cable is operatively arranged to extend through the second flange.

According to aspects illustrated herein, there is provided a coupling encapsulator, comprising a tubular member including a first end and a second end, a first end cap, including a first portion operatively arranged to engage the first end, a second portion connected to the first portion and extending in a first axial direction, and a first frusto-conical lip seal connected to the second portion and extending radially inward in a second axial direction, opposite the first axial direction, and a second end cap, including a third portion operatively arranged to engage the second end, a fourth portion connected to the third portion and extending in the first axial direction, and a second frusto-conical lip seal connected to the fourth portion and extending radially inward in the first axial direction.

According to aspects illustrated herein, there is provided a coupling encapsulator, comprising a tubular member including a first end and a second end, a first end cap, including a first portion operatively arranged to engage the first end, a second portion connected to the first portion, and a first lip seal connected to the second portion and extending radially inward, and a second end cap, including a third portion operatively arranged to engage the second end, a fourth portion connected to the third portion, and a second lip seal connected to the fourth portion and extending radially inward in the first axial direction.

According to aspects illustrated herein, there is provided an encapsulated splice coupler, comprising a splice coupler operatively arranged to connect a first cable and a second cable, and a coupling encapsulator, including a tubular member including a first end and a second end, the tubular member arranged concentrically around the splice coupler, a first end cap, including a first portion operatively arranged to engage the first end, a second portion connected to the first portion, and a first lip seal connected to the second portion and extending radially inward, and a second end cap, including a third portion operatively arranged to engage the second end, a fourth portion connected to the third portion, and a second lip seal connected to the fourth portion and extending radially inward in the first axial direction, wherein the splice coupler is slidable within the coupling encapsulator.

According to aspects illustrated herein, there is provided a coupling encapsulator comprises a tubular member and two end caps. The coupling encapsulator provides for the full encapsulation of a post-tensioned cable splice coupler that is compliant with the encapsulation of post-tensioned tendons in accordance with the material requirements for aggressive environments in the Post-Tensioning Institute (PTI) Specification for Unbonded Single Strand Tendons (PTI M10.2-00).

According to aspects illustrated herein, there is provide a coupling encapsulator for repairing post-tensioned concrete, including end caps secured to a tubular member used to prevent liquid intrusion into a post-tensioned tendon splice coupler that joins two individual sections of tendon together, and allows the splice coupler to move freely within the concrete member.

The purpose of the coupling encapsulator of the present disclosure is to completely encapsulate the post-tension cable splice coupler in order to keep any concrete or moisture from engaging the coupler. The coupling encapsulator comprises a tubular section including a first end and a second end, a first end cap operatively arranged to connect to the first end, and a second end cap operatively arranged to connect to the second end. In some embodiments the first end cap is substantially similar to the second end cap. In some embodiments, the first and second end caps are removably connected to the first and second ends, respectively. In some embodiments, the first and second end caps are secured to the first and second ends via a press or interference fit. In some embodiments, the first and second end caps are fixedly secured to the first and second ends, respectively. The end caps may be secured to the ends via any suitable means, for example, adhesives, bolts, screws, friction fit, etc. It should be appreciated that the coupling encapsulator comprises a non-corrosive material, for example polyethylene plastic. Polyethylene plastic is preferred over polyvinyl chloride (PVC) because PVC emits chlorine gas over time, which is corrosive to the steel splice coupler components. However, in some embodiments PVC may be used.

The tubular member of the coupling encapsulator is generally cylindrical. In some embodiments, the tubular member comprises an inner diameter of greater than or equal to 2.0 inches. It should be appreciated that the inner diameter of the tubular member may be any dimension suitable to fully encapsulate the post-tension cable splice coupler. In some embodiments, the tubular member is a minimum of 6.0 inches in length. The design of the instant coupling encapsulator allows the tubular member to be trimmed on the spot (i.e., at the work site) to the exact length necessary. In some embodiments, the tubular member may be trimmed to any length as necessary to allow the post-tension cable splice coupler up to sixteen inches of travel within the coupling encapsulator. As previously stated, the tubular member is preferably made of polyethylene plastic, not PVC.

The end caps are arranged at either end of the tubular member to fully encapsulate the splice coupler. The first end cap comprises a large end arranged for engagement with the tubular member and a small end arranged for engagement with cables and/or sealing members.

In some embodiments, the large end comprises an inner diameter of greater than or equal to two inches. In some embodiments, the large end comprises an inner diameter equal to the outer diameter of the tubular member. The end cap and tubular member are to be sealingly engaged and as such their diameters are selected as is necessary to provide an air/water tight seal and minimum separation force as required by material requirements for aggressive environments in the PTI Specification for Unbonded Single Strand Tendons (PTI M10.2-00). In some embodiments, the large end of the end cap is frusto-conical.

In some embodiments, the small end comprises an inner diameter of greater than or equal to 0.6 inches. In some embodiments, the small end comprises an inner diameter equal to the outer diameter of the post-tensioned cable sheathing or sealing member. The small end further comprises a lip seal which provides an air/water tight seal and minimum separation force as required by material requirements for aggressive environments in the PTI Specification for Unbonded Single Strand Tendons (PTI M10.2-00). In some embodiments, the lip seal of the small end is frusto-conical and extends axially inward from a distal edge of the small end. The purpose of the lip seal is to provide an easy yet efficient seal between the coupling encapsulator and the cables and/or sheathing or sealing members, while reducing the overall length of the coupling encapsulator. The lip seal also allows necessary movement of the end cap with respect to the cable and/or sheathing or sealing members without compromising the PTI encapsulation requirements. In some embodiments, the end cap comprises an overall length of approximately 1.35 inches, which minimizes the open space needed around the encapsulated splice coupler.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 3 is a perspective view of a coupling encapsulator as shown in FIG. 1;

FIG. 4 is a cross-sectional view of the coupling encapsulator taken generally along line 4-4 in FIG. 3;

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Moreover, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 1:
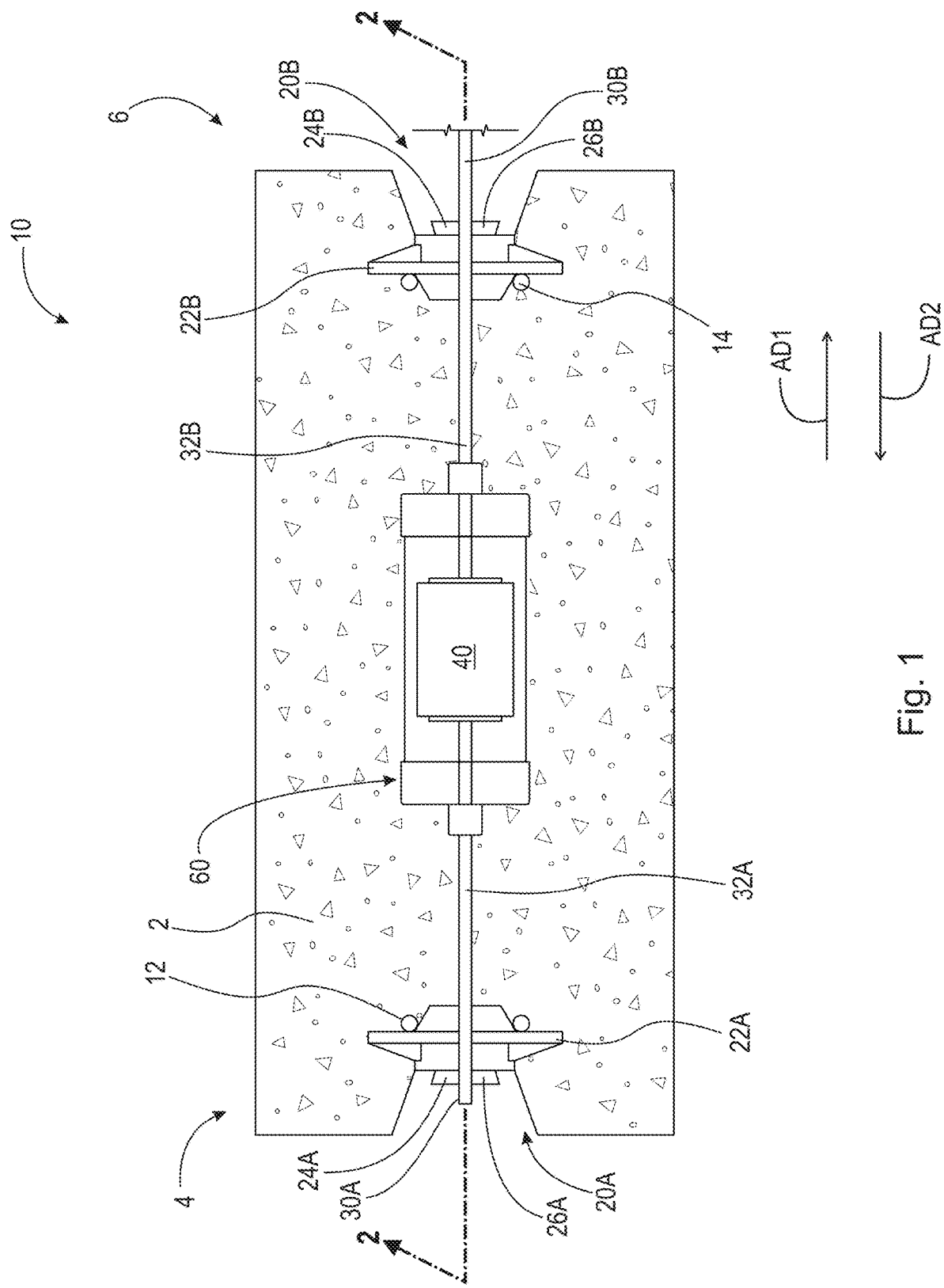
FIG. 1 is an elevational view of a post-tensioned concrete assembly.
Figure 2:
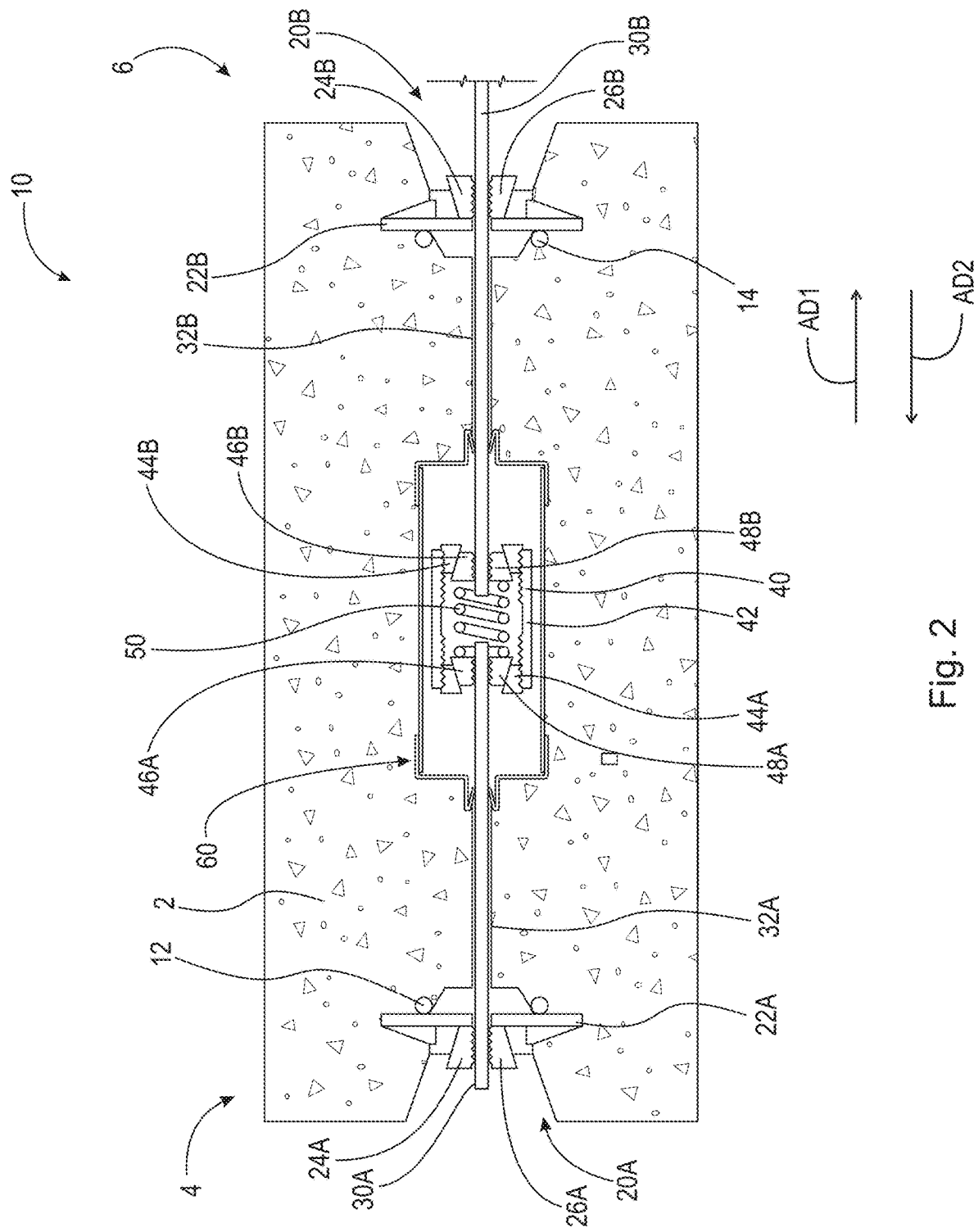
FIG. 2 is a cross-sectional view of the post-tensioned concrete assembly taken generally along line 2-2 in FIG. 1.

Adverting now to the figures, FIG. 1 is an elevational view of post-tensioned concrete assembly 10. FIG. 2 is a cross-sectional view of post-tensioned concrete assembly 10 taken generally along line 2-2 in FIG. 1. Post-tensioned concrete assembly 10 generally comprises one or more anchors, for example anchors 20A-B, cable 30A, cable 30B, post-tension cable splice coupler 40, and coupling encapsulator 60. Post-tensioned concrete assembly 10 is operatively arranged to provide tension to concrete slab 2 after it has cured. Concrete slab 2 may comprise, for example, end 4 and end 6. It should be appreciated that, for the purposes of description only, coupling encapsulator 60 is depicted in FIG. 1 as being transparent (or see through) to show the interaction of post-tension cable splice coupler 40 and cables 30A-B therein, and that this depiction should in no way limit the materials that may be used to manufacture coupling encapsulator 60. Furthermore, coupling encapsulator may be transparent, translucent, and/or opaque. The following description should be read in view of FIGS. 1-2.

Anchor 20A generally comprises plate 22A and wedges 24A and 26A. Plate 22A is operatively arranged to be fixed to concrete slab 2 at, for example, end 4. In the embodiment shown, plate 22A is secured within concrete slab 2 itself, that is, the concrete is poured at least partially around plate 22A and then allowed to cure, which fixes plate 22A therein. Furthermore, as shown in the figures, plate 22A is secured to "dead" end 4. As is known in the art, the dead end of a post-tensioned system is the end that is "pulled." For example, and as will be discussed in greater detail below, during the tensioning process, anchor 20A is pulled toward anchor 20B, which is secured to live end 6. In some embodiments, reinforcing bars 12 are arranged adjacent to plate 22A to provide further support to anchor 20A as tension is applied to cable 30A in axial to direction AD1. Wedges 24A and 26A are operatively arranged to engage plate 22A, for example, in a frusto-conical or conical hole therein. In some embodiments, wedge 24A and wedge 26A are at least partially frusto-conical and when connected together, have a circular geometry. Each of wedges 24A and 26A comprises a semi-circular geometry and includes a radially inward facing surface including a plurality of gripping members (e.g., teeth). As shown in FIG. 2, the outer portion of wedges 24A and 26A engage plate 22A and the inner portion of wedges 24A and 26A, which includes the plurality of teeth, engage cable 30A. As cable 30A is pulled or displaced in axial direction AD1, the frusto-conical hole of plate 22A forces wedges 24A and 26A radially toward cable 30A, thereby causing the pluralities of teeth to squeeze cable 30A and secure it to plate 22A of anchor 20A.

Anchor 20B generally comprises plate 22B and wedges 24B and 26B. Plate 22B is operatively arranged to be fixed to concrete slab 2 at, for example, end 6. In the embodiment shown, plate 22B is secured within concrete slab 2 itself, that is, the concrete is poured at least partially around plate 22B and then allowed to cure, which fixes plate 22B therein. Furthermore, as shown in the figures, plate 22B is secured to "live" end 6. As is known in the art, the live end of a post-tensioned system is the end that the cable or tendon is pulled toward. For example, during the tensioning process, anchor 20A, which is secured to dead end 4, is pulled toward anchor 20B, which is secured to live end 6. In some embodiments, reinforcing bars 14 are arranged adjacent to plate 22B to provide further support to anchor 20B as tension is applied to cables 30A-B and force is applied to plate 22B in axial direction AD2. Wedges 24B and 26B are operatively arranged to engage plate 22B, for example, in a frusto-conical or conical hole therein. In some embodiments, wedge 24B and wedge 26B are at least partially frusto-conical and when connected together, have a circular geometry. Each of wedges 24B and 26B comprises a semi-circular geometry and includes a radially inward facing surface including a plurality of gripping members (e.g., teeth). As shown in FIG. 2, the outer portion of wedges 24B and 26B engage plate 22B and the inner portion of wedges 24B and 26B, which includes the plurality of teeth, engage cable 30B. As tension is applied to cable 30A and/or cable 30B and then released, the tension within post-tensioned concrete assembly 10 pulls or displaces cable 30B and wedges 24B and 26B in axial direction AD2. The frusto-conical hole of plate 22B forces wedges 24B and 26B radially toward cable 30B, thereby causing the pluralities of teeth to squeeze cable 30B and secure it to plate 22B of anchor 20B.

Cable 30A is connected at a first end to anchor 20A and at a second end to post-tension cable splice coupler 40. Cable 30A is generally a thick rope of wire used in concrete construction to allow thinner slabs and greater span lengths between columns, which are also known as strands or tendons. In the embodiment shown, cable 30A operatively arranged in sheathing 32A. In some embodiments, sheathing 32A comprises a plastic such as polyethylene plastic. Cable 30A and its enclosing sheathing 32A is connected to anchor 20A and to coupling encapsulator 60, and post-tension cable splice coupler 40. Concrete is then poured thereover and left to cure, thereby forming concrete slab 2. Sheathing 32A is operatively arranged to protect cable 30A from moisture and concrete and also allows cable 30A to displace in axial directions AD1 and AD2 relative to concrete slab 2.

Cable 30B is connected to post-tension cable splice coupler 40 at a first end and to anchor 20B at a second end. Cable 30B is generally a thick rope of wire used in concrete construction to allow thinner slabs and greater span lengths between columns, which are also known as strands or tendons. In the embodiment shown, cable 30B operatively arranged in sheathing 32B. In some embodiments, sheathing 32B comprises a plastic such as polyethylene plastic. Cable 30B and its enclosing sheathing 32B is connected to anchor 20B and to coupling encapsulator 60, and post-tension cable splice coupler 40. Concrete is then poured thereover and left to cure, thereby forming concrete slab 2. Sheathing 32B is operatively arranged to protect cable 30B from moisture and concrete and also allows cable 30B to displace in axial directions AD1 and AD2 relative to concrete slab 2.

It should be appreciated that in some embodiments, cable 30A and 30B were once one single cable that either corroded and/or broke. For example, if a single cable providing post-tension to concrete slab 2 between anchors 20A and 20B became corroded at some point therebetween, concrete would be removed from concrete slab 2 to expose the corroded area of the cable, the corroded area would be cut out thereby forming cables 30A and 30B, and the cables then connected together via post-tension cable splice coupler 40. In another example, a significant force on concrete slab may cause the single cable to break, thereby forming cables 30A and 30B, the repair of which would again involve removing concrete from concrete slab 2 and connecting cables 30A and 30B with post-tension cable splice coupler 40.

Post-tension cable splice coupler 40 comprises threaded connecting tube 42, threaded end caps 44A-B, wedges 46A and 48A, wedges 46B and 48B, and spring 50. As shown in FIG. 2, end cap 44A is threadably engaged with tube 42 at a first end of tube 42 and end cap 44B is threadably engaged with tube 42 at a second end of tube 42. Wedges 46A, 48A, 46B, and 48B act similarly to the wedges of anchors 20A and 20B, as discussed below. Post-tension cable splice coupler 40 is operatively arranged to connect two cables together, for example, cables 30A and 30B, and allow for tension to be applied to the entire line (i.e., anchor 20A, cable 30A, post-tension cable splice coupler 40, cable 30B, and anchor 20B).

Wedges 46A and 48A are operatively arranged to engage end cap 44A, for example, in a frusto-conical or conical hole therein. In some embodiments, wedge 46A and wedge 48A are at least partially frusto-conical and when connected together, have a circular geometry. Each of wedges 46A and 48A comprises a semi-circular geometry and includes a radially inward facing surface including a plurality of gripping members (e.g., teeth). As shown in FIG. 2, the outer portion of wedges 46A and 48A engage end cap 44A and the inner portion of wedges 46A and 48A, which includes the plurality of teeth, engage cable 30A. As cable 30B and post-tension cable splice coupler 40 is pulled or displaced in axial direction AD1, the frusto-conical hole of end cap 44A forces wedges 46A and 48A radially toward cable 30A, thereby causing the pluralities of teeth to squeeze cable 30A and secure it to end cap 44A of post-tension cable splice coupler 40.

Wedges 46B and 48B are operatively arranged to engage end cap 44B, for example, in a frusto-conical or conical hole therein. In some embodiments, wedge 46B and wedge 48B are at least partially frusto-conical and when connected together, have a circular geometry. Each of wedges 46B and 48B comprises a semi-circular geometry and includes a radially inward facing surface including a plurality of gripping members (e.g., teeth). As shown in FIG. 2, the outer portion of wedges 46B and 48B engage end cap 44B and the inner portion of wedges 46B and 48B, which includes the plurality of teeth, engage cable 30B. As cable 30B is pulled or displaced in axial direction AD1, the frusto-conical hole of end cap 44B forces wedges 46B and 48B radially toward cable 30B, thereby causing the pluralities of teeth to squeeze cable 30B and secure it to end cap 44B of post-tension cable splice coupler 40.

Spring 50 is arranged within tube 42. In some embodiments, spring 50 is arranged concentrically within tube 42. Spring 50 is axially arranged between end cap 44A and end cap 44B. Specifically, spring 50 is operatively arranged to engage wedges 46A and 48A and wedges 46B and 48B. Spring 50 exerts a force on wedges 46A and 48A in axial direction AD2 such that they remain engaged with end cap 44A, and thus the teeth of wedges 46A and 48A remain engaged with cable 30A. Spring 50 exerts a force on wedges 46B and 48B in axial direction AD1 such that they remain engaged with end cap 44B, and thus the teeth of wedges 46B and 48B remain engaged with cable 30B.

Coupling encapsulator 60 is operatively arranged to encapsulate post-tension cable splice coupler 40 such that post-tension cable splice coupler 40 is slideable therein. Coupling encapsulator 60 is also operatively arranged to engage cables 30A-B and sheathing 32A-B such that cables 30A-B and post-tension cable splice coupler 40 is slidably displaceable in axial direction AD1 and axial direction AD2 with respect to concrete slab 2. Coupling encapsulator 60 generally comprises tubular member 62 and end caps 80A-B, as will be described in greater detail below with respect to FIGS. 3-6.

Figure 5:
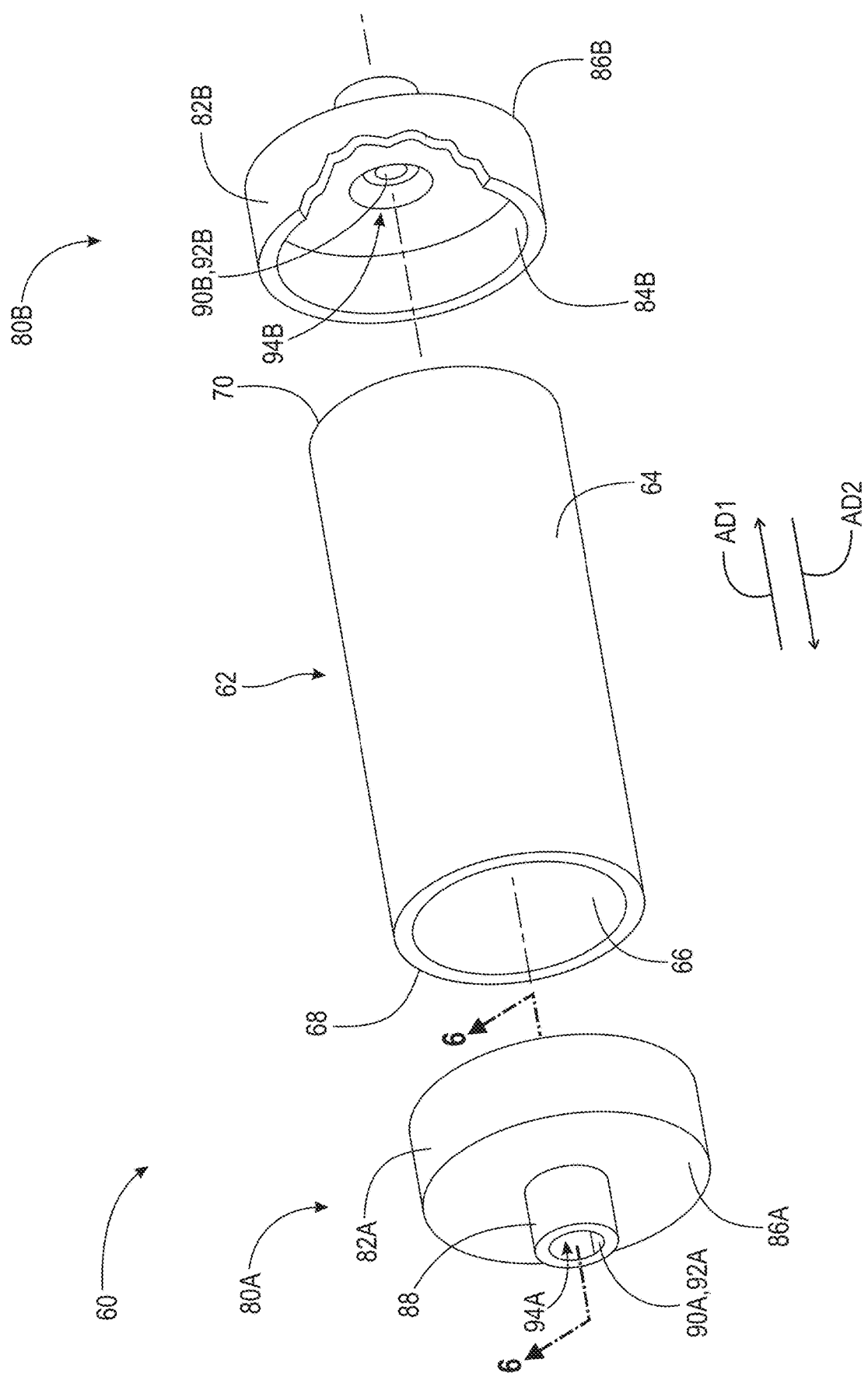
FIG. 5 is an exploded view of the coupling encapsulator shown in FIG. 3.
Figure 6:
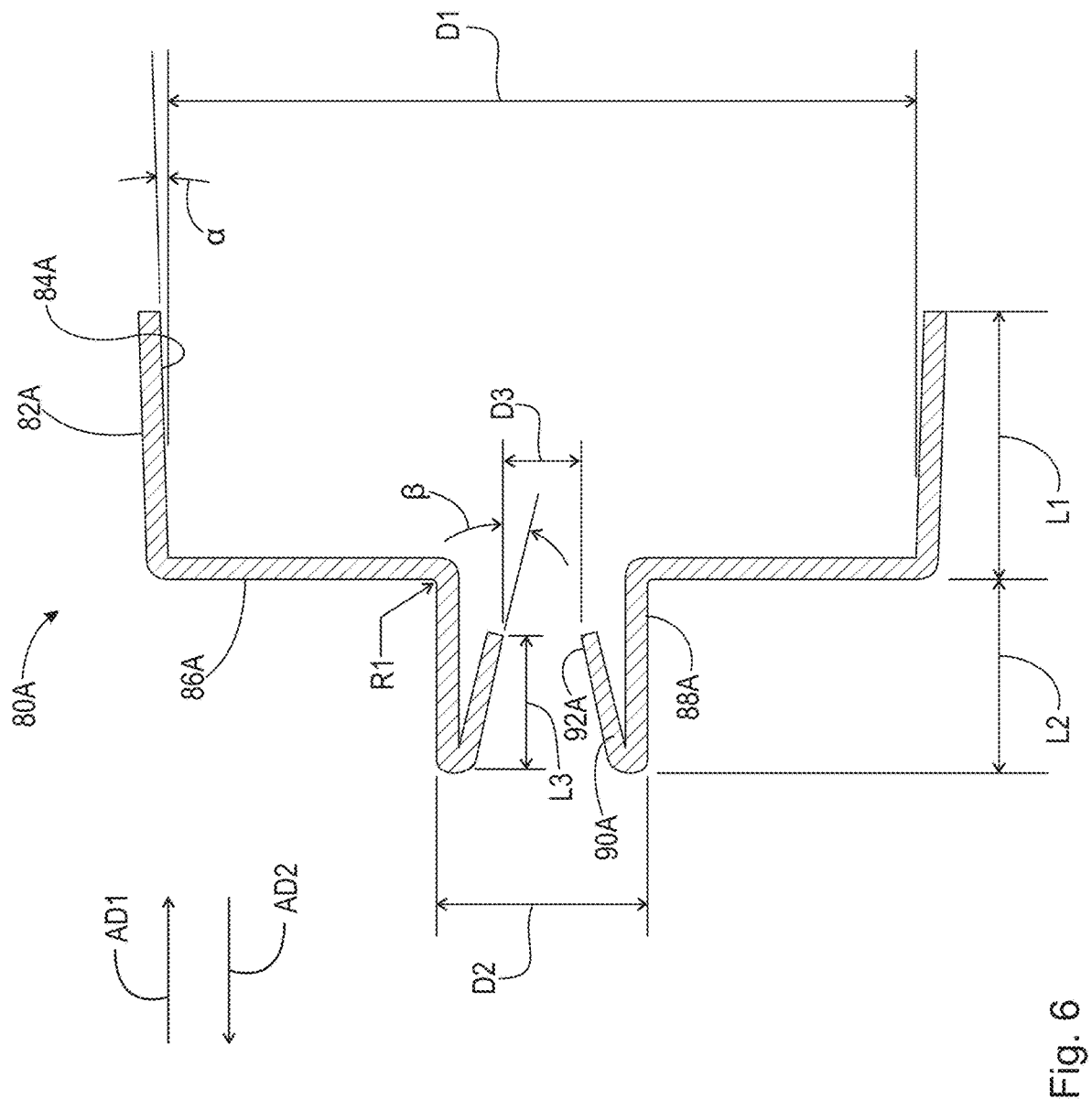
FIG. 6 is a cross-sectional view of an end cap taken generally along line 6-6 in FIG. 5.

FIG. 3 is a perspective view of coupling encapsulator 60. FIG. 4 is a cross-sectional view of coupling encapsulator 60 taken generally along line 4-4 in FIG. 3. FIG. 5 is an exploded view of coupling encapsulator 60 shown in FIG. 3. FIG. 6 is a cross-sectional view of end cap 80A taken generally along line 6-6 in FIG. 5. Coupling encapsulator 60 generally comprises tubular member 62, end cap 80A, and end cap 80B. The following description should be read in view of FIGS. 1-6.

Tubular member 62 comprises radially outward facing surface 64, radially inward facing surface 66, end 68, and end 70. In some embodiments, tubular member 62 comprises a circular geometry (i.e., is cylindrical); however, it should be appreciated that tubular member 62 may comprise any geometry suitable for encapsulating post-tension cable splice coupler 40 and allowing post-tension cable splice coupler 40 to be slideable and/or displaceable therein, for example, square, triangular, ovular, ellipsoidal, rectangular, etc. In some embodiments, tubular member 62 comprises a plastic such as polyethylene plastic. In some embodiments, tubular member 62 comprises PVC.

End cap 80A comprises segment 82A, segment 86A, segment 88A, and flange 90A. End cap 80A is operatively arranged to be connected to tubular member 62 to provide a fluid tight (or partial fluid tight) seal therebetween. End cap 80A is also operatively arranged to be connected to sheathing 32A to provide a fluid tight (or partial fluid tight) seal therebetween.

Segment 82A forms radially inward facing surface 84A, which is operatively arranged to engage tubular member 62 at end 68. Segment 82A is frusto-conical in shape and increases in diameter in axial direction AD1. For example, segment 82A extends from diameter D1 (at its connection with segment 86A) at angle α and at axial (along axial direction AD1) length L1. In some embodiments, angle α is 1.5°. In some embodiments, diameter D1 is 2.375 inches. In some embodiments, length L1 is 0.815 inches. Segment 82A is operatively arranged to engage end 68 and connect to tubular member 62 via interference fit or friction fit and to create a fluid tight (or a partially fluid tight) seal between end cap 80A and tubular member 62. Furthermore, the frusto-conical geometry of segment 82A allows end cap 80A to be quickly, easily, and efficiently connected to tubular member 62 at the work site. Specifically, the frusto-conical shape of segment 82A provides, upon engagement with tubular member 62, a "squeezing" effect on tubular member 62 which allows for securement via a friction or interference fit between radially outward facing surface 64 and radially inward facing surface 84A. In some embodiments, segment 82A is elastically or plastically deformable such that it may engage a tubular member having an outer diameter that is larger than diameter D1. In some embodiments, segment 82A is secured to tubular member 62 via adhesives.

Segment 86A is connected to 82A and extends radially inward therefrom. Segment 86A also acts as a boundary for end 68 of tubular member 62. In some embodiments, when end cap 80A is fully connected to tubular member 62, radially outward facing surface 64 abuts against radially inward facing surface 84A and end 68 abuts against segment 86A. In some embodiments, when end cap 80A is fully connected to tubular member 62, radially outward facing surface 64 abuts against radially inward facing surface 84A and end 68 is spaced apart from segment 86A.

Segment 88A is connected to segment 86A and extends therefrom in axial direction AD2. Segment 88A comprises a generally cylindrical geometry and has diameter D2. Diameter D2 is less than diameter D1. In some embodiments, diameter D2 is 1.0 inch. In some embodiments, segment 88A is perpendicular to segment 86A. In some embodiments, segment 88A is non-perpendicular to segment 86A.

In some embodiments, end cap 80A comprises radius R1 at the connection between segments 86A and 88A. In some embodiments, radius R1 is 0.05 inches. Segment 88A comprises axial length L2. In some embodiments, length L2 is 0.535 inches.

Flange 90A is connected to segment 88A and extends therefrom. Flange 90A is frusto-conical in shape and decreases in diameter in axial direction AD1. For example, flange 90A extends from diameter D2 (at its connection with segment 88A) at angle β and at axial (along axial direction AD1) length L3. Flange 90A comprises radially inward facing surface 92A and forms opening 94A, which, in a non-deformed state, comprises diameter D3. Flange 90A, specifically radially inward facing surface 92A, is operatively arranged to engage a radially outward facing surface of sheathing 32A thereby creating a fluid tight (or partial fluid tight) seal between end cap 80A and sheathing 32A. The frusto-conical shape of flange 90A provides, upon engagement with sheathing 32A, a "squeezing" effect on sheathing 32A which allows for securement via a friction or interference fit. In some embodiments, flange 90A is elastically or plastically deformable such that opening 94A may engage sheathing having an outer diameter that is larger than diameter D3. In some embodiments, flange 90A is secured to sheathing 32A via adhesives.

End cap 80B is substantially the same as end cap 80A. End cap 80B comprises segment 82B, segment 86B, segment 88B, and flange 90B. End cap 80B is operatively arranged to be connected to tubular member 62 to provide a fluid tight (or partial fluid tight) seal therebetween. End cap 80B is also operatively arranged to be connected to sheathing 32B to provide a fluid tight (or partial fluid tight) seal therebetween.

Segment 82B forms radially inward facing surface 84B, which is operatively arranged to engage tubular member 62 at end 70. Segment 82B is frusto-conical in shape and increases in diameter in axial direction AD2. For example, segment 82B extends from diameter D1 (at its connection with segment 86B) at angle α and at axial (along axial direction AD2) length L1. In some embodiments, angle α is 1.5°. In some embodiments, diameter D1 is 2.375 inches. In some embodiments, length L1 is 0.815 inches. Segment 82B is operatively arranged to engage end 70 and connect to tubular member 62 via interference fit or friction fit and to create a fluid tight (or a partially fluid tight) seal between end cap 80B and tubular member 62. Furthermore, the frusto-conical geometry of segment 82B allows end cap 80B to be quickly, easily, and efficiently connected to tubular member 62 at the work site. Specifically, the frusto-conical shape of segment 82B provides, upon engagement with tubular member 62, a "squeezing" effect on tubular member 62 which allows for securement via a friction or interference fit between radially outward facing surface 64 and radially inward facing surface 84B. In some embodiments, segment 82B is elastically or plastically deformable such that it may engage a tubular member having an outer diameter that is larger than diameter D1. In some embodiments, segment 82B is secured to tubular member 62 via adhesives.

Segment 86B is connected to 82B and extends radially inward therefrom. Segment 86B also acts as a boundary for end 70 of tubular member 62. In some embodiments, when end cap 80B is fully connected to tubular member 62, radially outward facing surface 64 abuts against radially inward facing surface 84B and end 70 abuts against segment 86B. In some embodiments, when end cap 80B is fully connected to tubular member 62, radially outward facing surface 64 abuts against radially inward facing surface 84B and end 70 is spaced apart from segment 86B.

Segment 88B is connected to segment 86B and extends therefrom in axial direction AD1. Segment 88B comprises a generally cylindrical geometry and has diameter D2. Diameter D2 is less than diameter D1. In some embodiments, diameter D2 is 1.0 inch. In some embodiments, segment 88B is perpendicular to segment 86B. In some embodiments, segment 88B is non-perpendicular to segment 86B. In some embodiments, end cap 80B comprises radius R1 at the connection between segments 86B and 88B. In some embodiments, radius R1 is 0.05 inches. Segment 88B comprises axial length L2. In some embodiments, length L2 is 0.535 inches.

Flange 90B is connected to segment 88B and extends therefrom. Flange 90B is frusto-conical in shape and decreases in diameter in axial direction AD2. For example, flange 90B extends from diameter D2 (at its connection with segment 88B) at angle β and at axial (along axial direction AD2) length L3. Flange 90B comprises radially inward facing surface 92B and forms opening 94B, which, in a non-deformed state, comprises diameter D3. Flange 90B, specifically radially inward facing surface 92B, is operatively arranged to engage a radially outward facing surface of sheathing 32B thereby creating a fluid tight (or partial fluid tight) seal between end cap 80B and sheathing 32B. The frusto-conical shape of flange 90B provides, upon engagement with sheathing 32B, a "squeezing" effect on sheathing 32B which allows for securement via a friction or interference fit. In some embodiments, flange 90B is elastically or plastically deformable such that opening 94B may engage sheathing having an outer diameter that is larger than diameter D3. In some embodiments, flange 90B is secured to sheathing 32B via adhesives.

During installation of coupling encapsulator 60 within post-tensioned concrete assembly 10, end cap 80A and tubular member 62 will be slid onto cable 30A, specifically over sheathing 32A, and end cap 80B will be slid onto cable 30B, specifically sheathing 32B, for example. Then post-tension cable splice coupler 40 is installed to connect cable 30A with cable 30B. Tubular member 62 is then positioned substantially circumferentially around and axially aligned with post-tension cable splice coupler 40. End cap 80A is secured to end 68 and end cap 80B is secured to end 70, at which point post-tension cable splice coupler 40 is completely encapsulated within coupling encapsulator 60. Concrete is then poured over sheathing 32A-B and coupling encapsulator 60 (and, in some embodiments, at least partially over anchors 20A-B) and left to cure, thereby forming concrete slab 2. Coupling encapsulator 60 is operatively arranged to protect post-tension cable splice coupler 40 from moisture and concrete and also allows post-tension cable splice coupler 40 to displace in axial directions AD1 and AD2 relative to concrete slab 2. Furthermore, the connection of anchor 20A, sheathing 32A, coupling encapsulator 60, sheathing 32B, and anchor 20B, protects cables 30A-B and post-tension cable splice coupler 40 from moisture and concrete and also allows cables 30A-B and post-tension cable splice coupler 40 to displace in axial directions AD1 and AD2 relative to concrete slab 2. Once the concrete is cured (i.e., hardened) is formed, tension is added to concrete slab 2 via post-tensioned concrete assembly 10. Since cables 30A-B and post-tension cable splice coupler 40 are not in direct contact with concrete slab 2 (nor were they during the curing process), they are displaceable therein as tension is applied to the system.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

2 Concrete slab
4 End
6 End
10 Post-tensioned concrete assembly
12 Reinforcing bars
14 Reinforcing bars
20A Anchor
20B Anchor
22A Plate
22B Plate
24A Wedge
24B Wedge
26A Wedge
26B Wedge
30A Cable
30B Cable
32A Sheathing
32B Sheathing
40 Post-tension cable splice coupler
42 Tubular member
44A End cap
44B End cap
46A Wedge
46B Wedge
48A Wedge
48B Wedge
60 Coupling encapsulator
62 Tubular member
64 Radially outward facing surface
66 Radially inward facing surface
68 End
70 End
80A End cap
80B End cap
82A Segment
82B Segment
84A Radially inward facing surface
84B Radially inward facing surface
86A Segment
86B Segment
88A Segment
88B Segment
90A Flange
90B Flange
92A Radially inward facing surface
92B Radially inward facing surface
94A Opening
94B Opening
D1 Diameter
D2 Diameter
D3 Diameter
L1 Length
L2 Length
L3 Length
α Angle
β Angle
AD1 Axial direction
AD2 Axial direction

What is claimed is:

1. A coupling encapsulator for a post-tension cable splice coupler, comprising:
    a tubular member including a first end and a second end;
    a first end cap, including:
        a first segment operatively arranged to engage the first end, the first segment being frusto-conical;
        a second segment connected to the first segment, wherein the first segment extends from the second segment in a first axial direction; and,
        a first flange connected to the second segment and tapering radially inward in the first axial direction and the first segment extending radially outward in the first axial direction; and,
    a second end cap, including:
        a third segment operatively arranged to engage the second end, the third segment being frusto-conical;
        a fourth segment connected to the third segment and extending in a second axial direction, opposite the first axial direction; and,
        a second flange connected to the fourth segment and tapering radially inward in the second axial direction and the third segment extending radially outward in the second axial direction.

2. The coupling encapsulator as recited in claim 1, wherein the first segment is arranged to sealingly engage with the first end.

3. The coupling encapsulator as recited in claim 1, wherein the third segment is arranged to sealingly engage with the second end.

4. The coupling encapsulator as recited in claim 1, further comprising a first sheathing operatively arranged to engage the first flange, the first flange being frusto-conical.

5. The coupling encapsulator as recited in claim 4, further comprising a second sheathing operatively arranged to engage the second flange, the second flange being frusto-conical.

6. The coupling encapsulator as recited in claim 1, wherein the first flange is frusto-conical.

7. The coupling encapsulator as recited in claim 6, wherein the first flange is deformable.

8. The coupling encapsulator as recited in claim 6, wherein the second flange is frusto-conical.

9. The coupling encapsulator as recited in claim 8, wherein the second flange is deformable.

10. A coupling encapsulator for a post-tension cable splice coupler, comprising:
    a tubular member including a first end and a second end;
    a first end cap, including:
        a first segment operatively arranged to engage the first end, the first segment being frusto-conic al;
        a second segment connected to the first segment, wherein the second segment arranged in parallel relation to the first end;
        a third segment perpendicularly connected to the second segment; and,
        a first flange connected to the third segment and tapering radially inward in a first axial direction and the first segment extending radially outward in the first axial direction; and,
    a second end cap, including:
        a fourth segment operatively arranged to engage the second end, the fourth segment being frusto-conical;

a fifth segment connected to the fourth segment, wherein the fifth segment is arranged in parallel relation to the second end;

a sixth segment perpendicularly connected to the fifth segment; and, a second flange connected to the sixth segment and tapering radially inward in a second axial direction, opposite the first axial direction, and the fourth segment extending radially outward in the second axial direction.

11. The coupling encapsulator as recited in claim 10, wherein the first end cap is secured to the first end, a space exists between the first end and the second segment.

12. The coupling encapsulator as recited in claim 10, wherein an axial length of the first flange is less than an axial length of the third segment.

13. The coupling encapsulator as recited in claim 10, further comprising a radius between the second segment and the third segment, the radius promoting radial displacement of the third segment with respect to the second segment.

14. A post-tensioned concrete assembly, comprising:
a first cable;
a second cable;
a post-tension cable splice coupler connecting the first cable and the second cable; and,
a coupling encapsulator, including:
  a tubular member including a first end and a second end, the post tension cable splice coupler arranged within the tubular member;
  a first end cap, including:
    a first segment operatively arranged to engage the first end;
    a second segment connected to the first portion, wherein the first segment extends from the second segment in a first axial direction; and,
    a first flange connected to the second segment and extending radially inward in the first axial direction, wherein the first cable is operatively arranged to extend through the first flange;
  a second end cap, including:
    a third segment operatively arranged to engage the second end;
    a fourth segment connected to the third segment and extending in a second axial direction, opposite the first axial direction; and,
    a second flange connected to the fourth segment and extending radially inward in the second axial direction, wherein the second cable is operatively arranged to extend through the second flange;
  a first sheathing operatively arranged to at least partially surround the first cable, the first flange being, frusto-conical, deformable, and engaged with the first sheathing; and,
  a second sheathing operatively arranged to at least partially surround the second cable, the second flange being, frusto-conical, deformable, and engaged with the second sheathing.

15. The post-tensioned concrete assembly as recited in claim 14, further comprising a first anchor connected to the first cable.

16. The post-tensioned concrete assembly as recited in claim 15, further comprising a second anchor connected to the second cable.

17. The post-tensioned concrete assembly as recited in claim 14, wherein the first segment is frusto-conical.

18. The post-tensioned concrete assembly as recited in claim 17, wherein the first segment is arranged to sealingly engage with the first end.

19. The post-tensioned concrete assembly as recited in claim 17, wherein the third segment is frusto-conical.

20. The post-tensioned concrete assembly as recited in claim 19, wherein the third segment is arranged to sealingly engage with the second end.

\* \* \* \* \*